United States Patent
Cao et al.

(10) Patent No.: US 11,255,579 B2
(45) Date of Patent: Feb. 22, 2022

(54) CONTROL METHOD OF TRANSCRITICAL CARBON DIOXIDE COMPOSITE HEAT PUMP SYSTEM

(71) Applicant: XI'AN JIAOTONG UNIVERSITY, Shaanxi (CN)

(72) Inventors: Feng Cao, Shaanxi (CN); Jing Wang, Shaanxi (CN); Xiang Yin, Shaanxi (CN); Mingjia Li, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 138 days.

(21) Appl. No.: 16/618,353

(22) PCT Filed: Dec. 11, 2018

(86) PCT No.: PCT/CN2018/120175
§ 371 (c)(1),
(2) Date: Nov. 30, 2019

(87) PCT Pub. No.: WO2019/141019
PCT Pub. Date: Jul. 25, 2019

(65) Prior Publication Data
US 2021/0164700 A1 Jun. 3, 2021

(30) Foreign Application Priority Data

Jan. 18, 2018 (CN) .......................... 201810049983.6

(51) Int. Cl.
*F25B 9/00* (2006.01)
*F25B 41/31* (2021.01)
(Continued)

(52) U.S. Cl.
CPC .............. *F25B 9/008* (2013.01); *F24H 4/02* (2013.01); *F25B 1/10* (2013.01); *F25B 7/00* (2013.01);
(Continued)

(58) Field of Classification Search
CPC .. F25B 9/008; F25B 41/31; F25B 1/10; F25B 30/02; F25B 49/02; F25B 2309/061; F25B 2400/06; F25B 2600/2513; F24H 4/02
See application file for complete search history.

(56) References Cited

U.S. PATENT DOCUMENTS

| | | | |
|---|---|---|---|
| 2007/0227165 A1* | 10/2007 | Ohta | ........................ F25B 40/00 62/196.1 |
| 2010/0043475 A1* | 2/2010 | Taras | ........................ F25B 7/00 62/331 |

(Continued)

FOREIGN PATENT DOCUMENTS

CN  106440441 A  * 2/2017

OTHER PUBLICATIONS

Neil A. Mehltretter Applying Variable Speed Compressors in Multiple Applications (httpswww.airbestpractices.comtechnologyair-compressorsapplying-variable-speed-compressors-multiple-applications-application-suc) 2017 (Year: 2021).*

*Primary Examiner* — Christopher R Zerphey
*Assistant Examiner* — Bejeir Brooks (57) ABSTRACT

A control method of a transcritical carbon dioxide composite heat pump system is disclosed, wherein the transcritical carbon dioxide composite heat pump system includes: a $CO_2$ main circuit compressor, an air-cooling-air-cooling recombiner, a supercooling-evaporation recombiner, an evaporator and a $CO_2$ auxiliary compressor; wherein the air-cooling-air-cooling recombiner comprises a $CO_2$ main circuit, a $CO_2$ auxiliary circuit and a water circuit; the supercooling-evaporation recombiner comprises a $CO_2$ main circuit supercooling section and a $CO_2$ auxiliary circuit evaporation section. The present invention includes two working modes according to the return water temperature, so that the unit has a wider application range and meets daily needs. There is only (Continued)

one heat exchanger for refrigerant and water. Compared with the three water and refrigerant heat exchangers in the conventional transcritical $CO_2$ composite heat pump, the circulating water circuit is a single circuit with one inlet and one outlet.

6 Claims, 3 Drawing Sheets

(51) Int. Cl.
  *F24H 4/02* (2022.01)
  *F25B 1/10* (2006.01)
  *F25B 30/02* (2006.01)
  *F25B 49/02* (2006.01)
  *F25B 25/00* (2006.01)
  *F25B 7/00* (2006.01)

(52) U.S. Cl.
  CPC ............ *F25B 25/005* (2013.01); *F25B 30/02* (2013.01); *F25B 41/31* (2021.01); *F25B 49/02* (2013.01); *F25B 49/022* (2013.01); *F25B 2309/06* (2013.01); *F25B 2309/061* (2013.01); *F25B 2313/003* (2013.01); *F25B 2400/06* (2013.01); *F25B 2600/2513* (2013.01)

(56) References Cited

U.S. PATENT DOCUMENTS

| | | | | |
|---|---|---|---|---|
| 2011/0289953 | A1* | 12/2011 | Alston | B60H 1/32 62/238.6 |
| 2012/0111032 | A1* | 5/2012 | Woo | F25B 13/00 62/79 |
| 2012/0116594 | A1* | 5/2012 | Aidoun | F25B 27/002 700/276 |
| 2017/0182869 | A1* | 6/2017 | Kujak | B60H 1/3226 |

* cited by examiner

CONTROL METHOD OF TRANSCRITICAL CARBON DIOXIDE COMPOSITE HEAT PUMP SYSTEM

CROSS REFERENCE OF RELATED APPLICATION

This is a U.S. National Stage under 35 U.S.C 371 of the International Application PCT/CN2018/120175, filed Dec. 11, 2018, which claims priority under 35 U.S.C. 119(a-d) to CN 201810049983.6, filed Jan. 18, 2018.

BACKGROUND OF THE PRESENT INVENTION

Field of Invention

The present invention relates to a technical field of heat pump, and more particularly to a control method of a transcritical carbon dioxide composite heat pump system.

Description of Related Arts

The heat pump can absorb the heat in the ambient air and transfer the heat to the circulating water through the working fluid circulation to play the role of heating. Conventional heat pumps mostly use conventional working fluids such as R134a and R410A, which are less environmentally friendly and face a gradual elimination trend.

G Lorentzen, former president of the International Society of Refrigeration, proposed the theory of $CO_2$ transcritical cycle, pointing out that it will have extremely broad development prospects in the field of heat pump. The critical temperature of $CO_2$ is very low at 31.1° C., so $CO_2$ heat pump systems generally use a transcritical cycle. The $CO_2$ transcritical cycle compressor has a higher exhaust temperature (up to 100° C.). Furthermore, in the transcritical region, $CO_2$ has a large temperature slip during the cooling process. This temperature slip is exactly matched with the required variable temperature heat source, which can heat the water to a very high temperature and maintain high efficiency, especially suitable for domestic hot water.

The difference between the $CO_2$ transcritical cycle system and the conventional subcritical cycle system is that in the conventional subcritical system, the temperature of the refrigerant remains constant in most areas of the condenser, while in the $CO_2$ transcritical cycle system, there is no two-phase zone in the critical pressure zone. The temperature and pressure are independent variables. The pressure change on the high pressure side also affects the cooling capacity, compressor power consumption and COP value.

The transcritical $CO_2$ heat pump cycle has a unique advantage in that the exothermic process temperature is high and there is a considerable temperature slip (about 80-100° C.). The research shows that: (1) When the evaporation temperature is 0° C., the water temperature can be heated from 0° C. to 60° C., and the heat pump COP can reach 4.3, which means the energy consumption is 75% lower than that of electric water heaters and gas water heaters. In cold regions, the heat and efficiency of conventional air source heat pumps decrease rapidly with decreasing ambient temperature, and the use of heat pumps is limited. The $CO_2$ heat pump system can maintain high heat supply and high water temperature in a low temperature environment, which greatly saves the energy consumed by the auxiliary heating equipment.

The performance of a transcritical carbon dioxide heat pump water heater is severely limited by the gas cooler outlet temperature, and the lower the gas cooler outlet temperature, the better the system performance. When the return water temperature in the water circulation system is sufficiently low (20° C. or even lower than 20° C.), the gas cooler outlet temperature of the transcritical carbon dioxide heat pump water heater can also be cooled by circulating water to a relatively low temperature, and the system performance is excellent at this time. However, when the return water temperature is higher than 25° C. (considering the heat exchange temperature difference, the gas cooler outlet carbon dioxide temperature may reach 30° C.), the performance of the system will drop sharply with the increase of the return water temperature, when the return water temperature is higher than 40° C., the performance of the carbon dioxide heat pump system is extremely poor, and the heating COP is even below 1.5.

The conventional transcritical $CO_2$ composite heat pump two circuits of return waters. The first return water enters the auxiliary gas cooler and then returns to the water outlet. The second return water enters the auxiliary evaporator, and the cooled water enters the gas cooler of the main cycle and returns to the water outlet. The first circuit water is mixed with the second circuit water to supply the user.

The conventional fixed-frequency heat pump system uses a fixed-frequency compressor, which has two circuits and requires three heat exchangers of refrigerant and water. The distribution and connection of the water circuits is extremely complicated and prone to failure. It can only be operated under design conditions (when the return water temperature in the water circulation system is sufficiently low (20° C. or even lower), the gas cooler outlet temperature of the transcritical carbon dioxide heat pump water heater can also be cooled to a relatively low temperature by circulating water, providing excellent system performance). As a result, the flow rate of the circuit during operation cannot be adjusted according to the change of working conditions. Especially for the main-auxiliary composite heat pump products, the fixed compressor flow ratio is difficult to adapt to variable working conditions, resulting in energy waste or performance degradation of the system under non-design conditions (when the return water temperature is higher than 25° C. (considering the heat transfer temperature difference, the gas cooler outlet carbon dioxide temperature may reach 30° C.), the performance of the system will drop sharply with the increase of the return water temperature, when the return water temperature is higher than 40° C., the performance of the carbon dioxide heat pump system is extremely poor, and the heating COP is even below 1.5).

SUMMARY OF THE PRESENT INVENTION

An object of the present invention is to provide a control method of a transcritical carbon dioxide composite heat pump system, which solves the problem that the performance of the conventional transcritical $CO_2$ composite heat pump is severely restricted by the gas cooler outlet temperature, water distribution and connection complexity, and solves the problem of energy waste. Meanwhile, the present invention improves the fact that the conventional fixed-frequency heat pump system using fixed-frequency compressor, the circuit flow rate cannot be changed. Especially for the main-auxiliary composite heat pump products, the fixed compressor flow ratio is difficult to adapt to variable working conditions. The heat pump of the present invention is divided into main circuit and auxiliary circuit; wherein under normal working conditions, the return water temperature is low (30° C. or lower), and a direct heating mode is used; when the return water temperature is high (above 30° C.)), a cyclic heating mode is used. The two modes are alternately operated, which effectively improves the shortcomings of the conventional system that cannot adapt to the variable working conditions, so as to avoid the poor performance of the conventional system under non-design conditions and the waste of energy. While maintaining the high performance multiple working conditions, due to the alternation of the two modes, the energy waste caused by the conventional single operating mode system is avoided, and the number of heat exchangers is reduced. As a result, the structure of the system is simplified, and the probability of failure is reduced.

Accordingly, in order to accomplish the above object, the present invention provides:

a control method of a transcritical carbon dioxide composite heat pump system, wherein the transcritical carbon dioxide composite heat pump system comprises: a $CO_2$ main circuit compressor, an air-cooling-air-cooling recombiner, a supercooling-evaporation recombiner, an evaporator and a $CO_2$ auxiliary compressor; wherein the air-cooling-air-cooling recombiner comprises a $CO_2$ main circuit, a $CO_2$ auxiliary circuit and a water circuit; the supercooling-evaporation recombiner comprises a $CO_2$ main circuit supercooling section and a $CO_2$ auxiliary circuit evaporation section; the transcritical carbon dioxide composite heat pump system comprises a main circuit and an auxiliary circuit; for the main circuit: an outlet of the $CO_2$ main circuit compressor is connected to an inlet of the $CO_2$ main circuit of the air-cooling-air-cooling recombiner; an outlet of the $CO_2$ main circuit of the air-cooling-air-cooling recombiner is connected to an inlet of the $CO_2$ main circuit supercooling section of the supercooling-evaporation recombiner; an outlet of the $CO_2$ main circuit supercooling section of the subcooling-evaporation recombiner is connected to an inlet of the evaporator; and an outlet of the evaporator is connected to an inlet of the $CO_2$ main circuit compressor; for the auxiliary circuit: an outlet of the $CO_2$ auxiliary compressor is connected to an inlet of the $CO_2$ auxiliary circuit of the air-cooling-air-cooling recombiner; an outlet of the $CO_2$ auxiliary circuit of the air-cooling-air-cooling recombiner is connected to an inlet of the $CO_2$ auxiliary circuit evaporation section of the supercooling-evaporation recombiner; an outlet of the $CO_2$ auxiliary circuit evaporation section of the supercooling-evaporation recombiner is connected to an inlet of the $CO_2$ auxiliary compressor; a $CO_2$ main circuit expansion valve is arranged between the supercooling-evaporation recombiner and the evaporator on the main circuit; and a $CO_2$ auxiliary expansion valve is arranged between the air-cooling-air-cooling recombiner and the supercooling-evaporation recombiner on the auxiliary circuit;

the transcritical carbon dioxide composite heat pump system operates in a cyclic heating mode, and the control method comprises steps of:

starting the $CO_2$ main circuit compressor and turning on the main circuit; starting the $CO_2$ auxiliary compressor and turning on the auxiliary circuit, and keeping a fan at a working state; for the main circuit: compressing a $CO_2$ working fluid from a state point a through the $CO_2$ main circuit compressor to reach a state point b, and moving the $CO_2$ working fluid into the $CO_2$ main circuit of the air-cooling-air-cooling recombiner for heating circulating water in the water circuit; self-cooling the $CO_2$ working fluid to an appropriate temperature to reach a state point c, then passing the $CO_2$ working fluid through the $CO_2$ main circuit supercooling section of the supercooling-evaporation recombiner to exchange heat with the $CO_2$ auxiliary circuit evaporation section, so as to further cool down to reach a state point d; then moving the $CO_2$ working fluid into the $CO_2$ main circuit expansion valve to be expanded, in such a manner that an expanded low-pressure working fluid reaches a state point e; moving the expanded low-pressure working fluid into the evaporator for evaporation and absorbing heat, so as to return to the state point a, and finally returning to the inlet of the $CO_2$ main circuit compressor; for the auxiliary circuit: compressing the $CO_2$ working fluid from a state point f through the $CO_2$ auxiliary compressor to reach a state point g, and moving the $CO_2$ working fluid into the $CO_2$ auxiliary circuit of the air-cooling-air-cooling recombiner for heating the circulating water in the water circuit; self-cooling the $CO_2$ working fluid to reach a state point h, then moving the $CO_2$ working fluid into the $CO_2$ auxiliary circuit expansion valve to be expanded to reach a state point i; moving the expanded low-pressure working fluid into the $CO_2$ auxiliary circuit evaporation section of the supercooling-evaporation recombiner for exchanging heat with and further cooling the $CO_2$ main circuit supercooling section; self-evaporating the expanded low-pressure working fluid to absorb heat and reach the state point f, and finally returning to the inlet of the $CO_2$ auxiliary compressor.

Preferably, in the air-cooling-air-cooling recombiner, the $CO_2$ working fluid of the main circuit is cooled and releases heat in the $CO_2$ main circuit, and the $CO_2$ working fluid of the auxiliary circuit is cooled and releases heat in the $CO_2$ auxiliary circuit; the circulating water absorbs heat to reach a preset temperature; in the supercooling-evaporation recombiner, the $CO_2$ working fluid of the main circuit is further cooled and releases heat in the $CO_2$ main circuit supercooling section, and the $CO_2$ working fluid of the auxiliary circuit is evaporated and absorbs heat in the $CO_2$ auxiliary circuit evaporation section; the $CO_2$ auxiliary circuit evaporation section exchanges heat with the $CO_2$ main circuit supercooling section to maintain heat balance.

Preferably, an auxiliary circuit control method comprises steps of: collecting an ambient temperature $t_{ambient}$, a $CO_2$ auxiliary circuit outlet temperature $t_{g,out\ auxiliary}$ of the air-cooling-air-cooling recombiner set by a user, and a water circuit outlet temperature $t_{return}$ of the air-cooling-air-cooling recombiner set by the user; calculating an exhaust pressure $P_{co_2,auxiliary}$ of the $CO_2$ auxiliary compressor by a formula, and adjusting an opening degree of the $CO_2$ auxiliary expansion valve to achieve a preset pressure; and calculating a motor frequency $f_{compress\ 6}$ of the $CO_2$ auxiliary compressor by a formula, in such a manner that a compressor frequency changes with a working condition;

$$P_{co_2,auxiliary}=0.0036t_{g,out\ auxiliary}^2-0.02t_{g,out\ auxiliary}-0.035t_{ambient}+0.067t_{return}+7.38 \quad (I);$$

$$f_{compress\ 6}=50-0.005t_{g,out\ auxiliary}^2+0.17t_{g,out\ auxiliary}+0.65t_{ambient}+0.13t_{return} \quad (II);$$

wherein a main circuit control method comprises steps of: collecting the ambient temperature $t_{ambient}$, a $CO_2$ main circuit outlet temperature $t_{g,out\ main}$ of the air-cooling-air-cooling recombiner set by the user, and the water circuit outlet temperature $t_{return}$ of the air-cooling-air-cooling recombiner set by the user; then calculating an optimal discharge pressure $P_{CO2,main}$ of the $CO_2$ main circuit compressor by a formula, and adjusting an opening degree of the $CO_2$ main circuit expansion valve to achieve a preset pressure;

$$P_{CO2,main} = \quad\quad\quad\quad\quad\quad\quad\quad (III)$$

$$\frac{50}{f_{compressor1}}(0.00171t_{g,out\ main}^2 - 0.03t_{g,out\ main} - 0.018t_{ambient} -$$

$$0.03\sqrt{t_{return}} + 7.38).$$

Preferably, the air-cooling-air-cooling recombiner comprises three inner pipes and one outer pipe, wherein two of the inner pipes serve as the $CO_2$ main circuit, and the other one of the inner pipes serves as the $CO_2$ auxiliary circuit; a circuit between the outer pipe and the three inner pipes is the water circuit; the three inner pipes are arranged in an equilateral triangle form with identical pipe spacings $D_L$ and identical diameters $D_2$; the outer pipe has a diameter $D_1$; first ends of the two $CO_2$ main circuits are combined into one pipe connected to an exhaust port of the $CO_2$ main circuit compressor on an external side of the air-cooling-air-cooling recombiner, and second ends of the two $CO_2$ main circuits are combined into one pipe connected to the $CO_2$ main circuit supercooling section on the external side of the air-cooling-air-cooling recombiner;

a relationship between the pipe spacings $D_L$ of the three inner pipes, the diameters $D_2$ of the three inner pipes, and the diameter $D_1$ of the outer pipe is:

$$D_L=1.7D_2 \quad\quad\quad\quad\quad\quad\quad\quad (IV)$$

$$D_1/D_2=3.7 \quad\quad\quad\quad\quad\quad\quad\quad (V).$$

Preferably, the fan is installed on the evaporator.

Preferably, the $CO_2$ auxiliary compressor is an inverter compressor.

Preferably, the transcritical carbon dioxide composite heat pump system operates in the cyclic heating mode when a water circuit outlet temperature of the air-cooling-air-cooling recombiner set by the user is greater than or equal to 30° C.

Compared with the prior art, the present invention has the following beneficial effects.

The present invention provides a transcritical $CO_2$ composite heat pump and a control method thereof, which adopts a control mode in which a heat pump is divided into a main circuit and an auxiliary circuit. As a result, under normal working conditions, when the return water temperature is relatively low (30° C. or lower), the direct heating mode is used; when the return water temperature is relatively high (above 30° C.), it is converted into the cyclic heating mode, so that the system can adapt to the variable working conditions and save energy.

When the return water temperature is relatively high (above 30° C.), the cyclic heating mode is operated for starting the $CO_2$ main circuit compressor and turning on the main circuit; starting the $CO_2$ auxiliary compressor and turning on the auxiliary circuit, and keeping a fan at a working state. In the first subcooling-evaporation recombiner, the $CO_2$ of the auxiliary circuit evaporates and absorbs heat, and the $CO_2$ in the main circuit is cooled for a second time, so that the $CO_2$ in the main circuit reaches a suitable outlet temperature to ensure high system performance.

Furthermore, in the present invention, there is only one heat exchanger for refrigerant and water, that is, the air-cooling-air-cooling recombiner. Compared with the three water and refrigerant heat exchangers in the conventional transcritical $CO_2$ composite heat pump, the circulating water circuit is a single circuit with one inlet and one outlet. The system is simple, and the failure rate is reduced.

Furthermore, according to the actual return water temperature, by controlling the two compressors, the direct heating mode and the cyclic heating mode are switched, so that the heat pump unit has a wider application range and higher performance.

Furthermore, $CO_2$ is an inert gas, which is non-toxic and non-irritating; safe and chemical stability; safe and non-toxic, and non-flammable. $CO_2$ does not decompose to generate harmful gases even at high temperatures, and its global warming potential index GWP is 1. $CO_2$ does not need industrial synthesis, it only needs to be extracted in the atmosphere, and it is convenient to use. At the same time, it has no destructive effect on the atmospheric ozone layer, and the ODP is zero. Moreover, the superior thermophysical properties of $CO_2$ itself and good migration characteristics are also suitable as refrigerants.

Furthermore, the heating method of the present invention adopts a $CO_2$ heat pump type, which has higher energy utilization rate and is more energy-saving. The latent heat of $CO_2$ evaporation is large, the unit volume is high in refrigeration, and has excellent flow and heat transfer characteristics, which can significantly reduce the size of the system and make the whole system very compact.

Furthermore, the transcritical $CO_2$ heat pump cycle has a unique advantage in that the exothermic process temperature is high and there is a considerable temperature slip (about 80-100° C.). Its heat pump COP can reach 4.3, which means the energy consumption is 75% lower than that of electric water heaters and gas water heaters. In cold regions, the heat and efficiency of conventional air source heat pumps decrease rapidly with decreasing ambient temperature, and the use of heat pumps is limited. The $CO_2$ heat pump system can maintain high heat supply in a low temperature environment, which greatly saves the energy consumed by the auxiliary heating equipment.

Furthermore, the auxiliary circuit adopts the inverter compressor to enable the heat pump water heater system to operate stably and reliably for a long time under wider load and temperature conditions, which reduces power consumption and starting current of the compressor.

Furthermore, when the return water temperature is high, the exhaust pressure of the $CO_2$ auxiliary circuit is higher, the heat generation is larger, and the operation effect is better. From the perspective of the control principle, formula (I) is proposed for controlling the exhaust pressure of the compressor (6), so as to ensure the high performance of the entire system.

Furthermore, the temperature at d in the cycle needs to be maintained at a suitable value. In order to balance the power consumption of the compressor (6), the frequency of the compressor can be varied with the working conditions, and the optimum of the compressor (6) is calculated by the formula (II). Controlling the speed of the compressor (6) keeps the system operating efficiently.

Furthermore, the optimal exhaust pressure of the compressor (1) can be calculated by the formula (III), so that the main circuit can always maintain a higher efficiency operation.

Furthermore, using formulas (IV) and (V), the air-cooling-air-cooling recombiner with the highest heat exchange efficiency can be selected to improve the overall performance of the system.

Element reference: 1—$CO_2$ main circuit compressor; 2—air-cooling-air-cooling recombiner; 3—supercooling-evaporation recombiner; 4—$CO_2$ main circuit expansion valve; 5—evaporator; 6—$CO_2$ auxiliary compressor; 7—$CO_2$ auxiliary expansion valve; 8—fan; 9—$CO_2$ main circuit; 10—$CO_2$ auxiliary circuit; 11—water circuit; 12—$CO_2$ main circuit supercooling section; 13—$CO_2$ auxiliary circuit evaporation section.

DETAILED DESCRIPTION OF THE PREFERRED EMBODIMENT

Referring to the drawings, the present invention will be further illustrated bellow.

Figure 1:
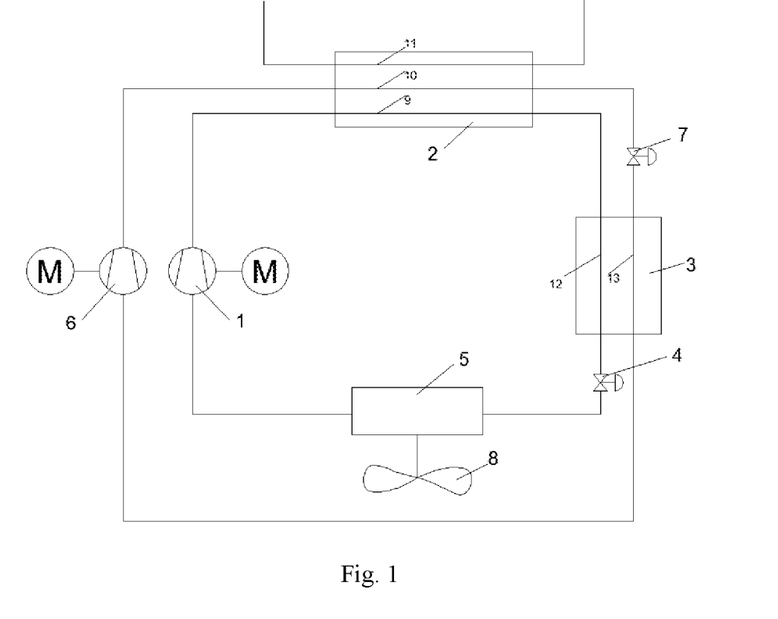
FIG. 1 is a structural view of a transcritical carbon dioxide composite heat pump system of the present invention.

Referring to FIG. 1, a transcritical carbon dioxide composite heat pump system of the present invention comprises: a $CO_2$ main circuit compressor 1, an air-cooling-air-cooling recombiner 2, a supercooling-evaporation recombiner 3, an evaporator 5 and a $CO_2$ auxiliary compressor 6.

The air-cooling-air-cooling recombiner 2 comprises a $CO_2$ main circuit 9, a $CO_2$ auxiliary circuit 10 and a water circuit 11; the supercooling-evaporation recombiner 3 comprises a $CO_2$ main circuit supercooling section 12 and a $CO_2$ auxiliary circuit evaporation section 13.

The transcritical carbon dioxide composite heat pump system comprises a main circuit and an auxiliary circuit;

for the main circuit: an outlet of the $CO_2$ main circuit compressor 1 is connected to an inlet of the $CO_2$ main circuit 9 of the air-cooling-air-cooling recombiner 2; an outlet of the $CO_2$ main circuit 9 of the air-cooling-air-cooling recombiner 2 is connected to an inlet of the $CO_2$ main circuit supercooling section 12 of the supercooling-evaporation recombiner 3; an outlet of the $CO_2$ main circuit supercooling section 12 of the subcooling-evaporation recombiner 3 is connected to an inlet of the evaporator 5; and an outlet of the evaporator 5 is connected to an inlet of the $CO_2$ main circuit compressor 1;

for the auxiliary circuit: an outlet of the $CO_2$ auxiliary compressor 6 is connected to an inlet of the $CO_2$ auxiliary circuit 10 of the air-cooling-air-cooling recombiner 2; an outlet of the $CO_2$ auxiliary circuit 10 of the air-cooling-air-cooling recombiner 2 is connected to an inlet of the $CO_2$ auxiliary circuit evaporation section 13 of the supercooling-evaporation recombiner 3; an outlet of the $CO_2$ auxiliary circuit evaporation section 13 of the supercooling-evaporation recombiner 3 is connected to an inlet of the $CO_2$ auxiliary compressor 6.

A $CO_2$ main circuit expansion valve 4 is arranged between the supercooling-evaporation recombiner 3 and the evaporator 5 on the main circuit; and a $CO_2$ auxiliary expansion valve 7 is arranged between the air-cooling-air-cooling recombiner 2 and the supercooling-evaporation recombiner 3 on the auxiliary circuit.

A fan 8 is installed on the evaporator 5. By changing the speed of the fan, the proper heat transfer coefficient can be adjusted.

The $CO_2$ auxiliary compressor 6 is an inverter compressor.

Figure 6:
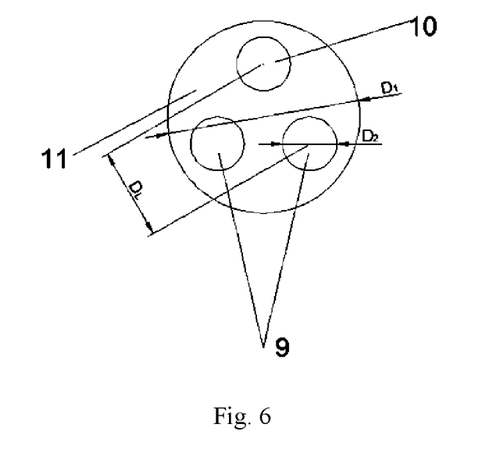
FIG. 6 is a sketch view of internal piping arrangement of an air-cooling-air-cooling recombiner of the transcritical carbon dioxide composite heat pump system according to the present invention.

Referring to FIG. 6, the air-cooling-air-cooling recombiner 2 comprises three inner pipes and one outer pipe, wherein two of the inner pipes serve as the $CO_2$ main circuit 9, and the other one of the inner pipes serves as the $CO_2$ auxiliary circuit 10; a circuit between the outer pipe and the three inner pipes is the water circuit 11; the three inner pipes are arranged in an equilateral triangle form with identical pipe spacings $D_L$ and identical diameters $D_2$; the outer pipe has a diameter $D_1$; first ends of the two $CO_2$ main circuits 9 are combined into one pipe connected to an exhaust port of the $CO_2$ main circuit compressor 1 on an external side of the air-cooling-air-cooling recombiner 2, and second ends of the two $CO_2$ main circuits 9 are combined into one pipe connected to the $CO_2$ main circuit supercooling section 12 on the external side of the air-cooling-air-cooling recombiner 2.

Figure 2:
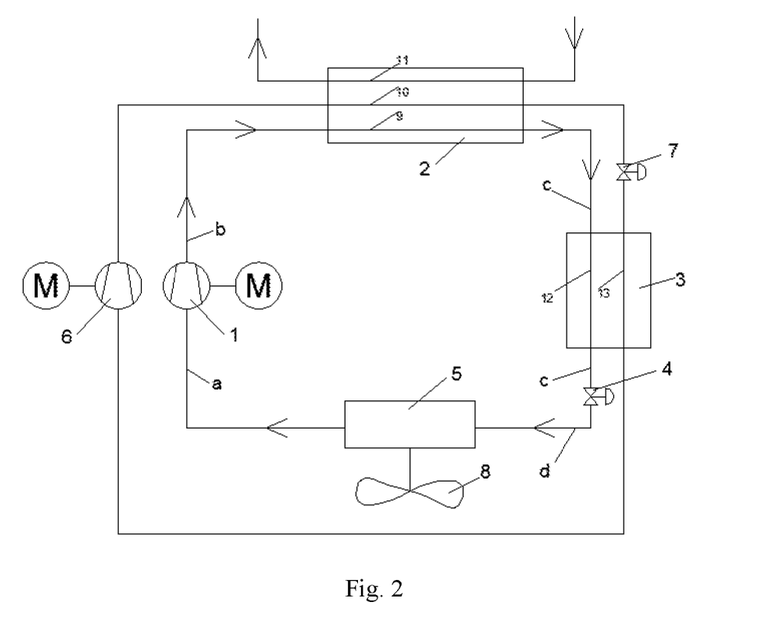
FIG. 2 is a structural view of the transcritical carbon dioxide composite heat pump system in a direct heating according to the present invention.
Figure 3:
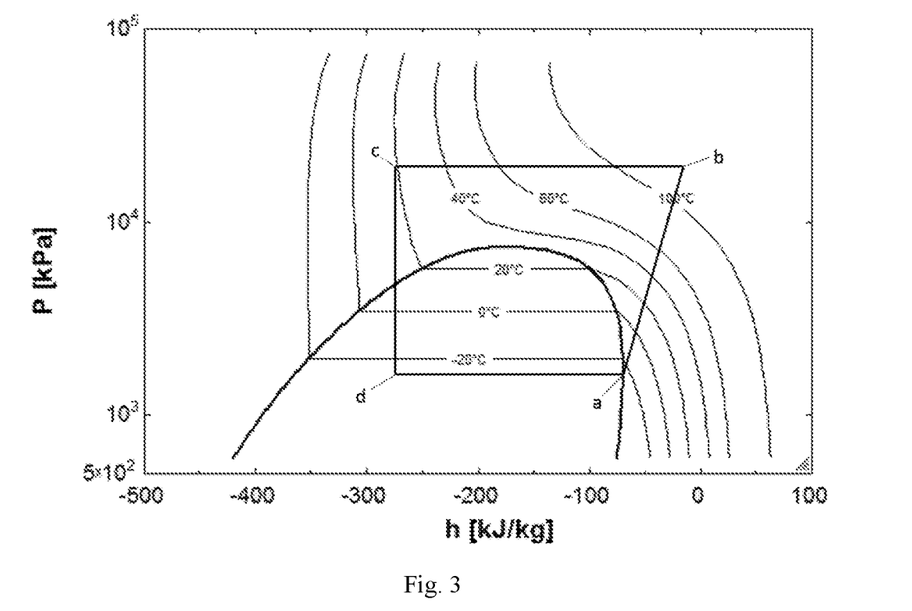
FIG. 3 is a schematic diagram of a cycle of the transcritical carbon dioxide composite heat pump system in the direct heating mode according to the present invention.

In order to ensure proper cooling temperature of the $CO_2$ when the return water temperature is changed, thereby ensuring high system performance, the present invention sets two operating modes:

Direct heating mode (return water temperature is 30° C. or lower): referring to FIGS. 2 and 3, starting the $CO_2$ main circuit compressor 1 and turning on the main circuit; shutting down the $CO_2$ auxiliary compressor 6 and turning off the auxiliary circuit, and keeping the fan 8 at a working state; for the main circuit: compressing a $CO_2$ working fluid from a state point a through the $CO_2$ main circuit compressor 1 to reach a state point b, and moving the $CO_2$ working fluid into the $CO_2$ main circuit 9 of the air-cooling-air-cooling recombiner 2 for heating circulating water in the water circuit 11; self-cooling the $CO_2$ working fluid to an appropriate temperature to reach a state point c, then passing the $CO_2$ working fluid through the $CO_2$ main circuit supercooling section 12 of the supercooling-evaporation recombiner 3 and maintaining the state point c; then moving the $CO_2$ working fluid into the $CO_2$ main circuit expansion valve 4 to be expanded, in such a manner that an expanded low-pressure working fluid reaches a state point d; moving the expanded low-pressure working fluid into the evaporator 5 for evaporation and absorbing heat, so as to return to the state point a, and finally returning to the inlet of the $CO_2$ main circuit compressor 1.

Figure 4:
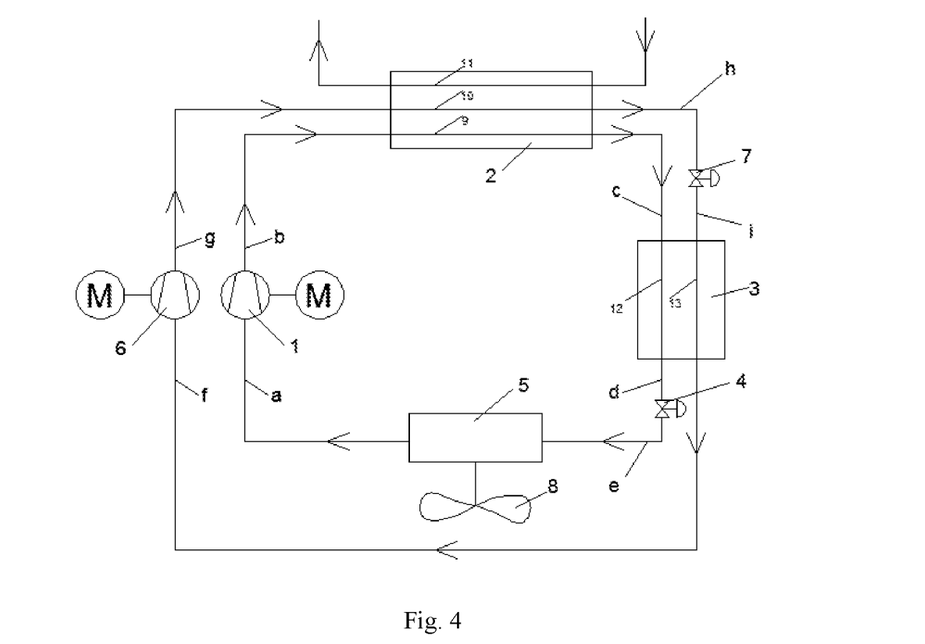
FIG. 4 is a structural view of the transcritical carbon dioxide composite heat pump system in a cyclic heating mode according to the present invention.
Figure 5:
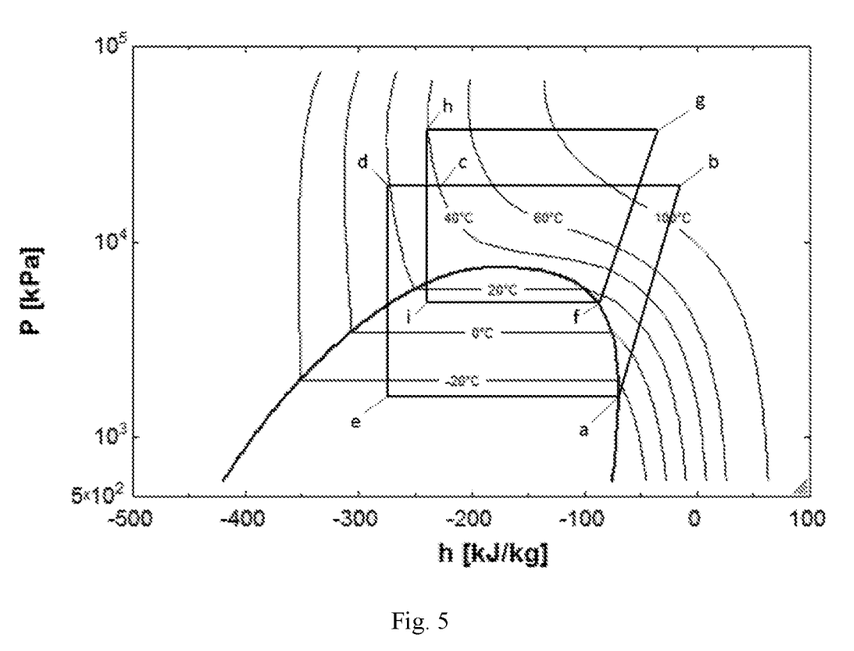
FIG. 5 is a schematic diagram of a cycle of the transcritical carbon dioxide composite heat pump system in the cyclic heating mode according to the present invention.

Cyclic heating mode (return water temperature is above 30° C.): referring to FIGS. 4 and 5, starting the $CO_2$ main circuit compressor 1 and turning on the main circuit; starting the $CO_2$ auxiliary compressor 6 and turning on the auxiliary circuit, and keeping a fan 8 at a working state; for the main circuit: compressing a $CO_2$ working fluid from a state point a through the $CO_2$ main circuit compressor 1 to reach a state point b, and moving the $CO_2$ working fluid into the $CO_2$ main circuit 9 of the air-cooling-air-cooling recombiner 2 for heating circulating water in the water circuit 11; self-cooling the $CO_2$ working fluid to an appropriate temperature to reach a state point c, then passing the $CO_2$ working fluid through the $CO_2$ main circuit supercooling section 12 of the supercooling-evaporation recombiner 3 to exchange heat with the $CO_2$ auxiliary circuit evaporation section 13, so as to further cool down to reach a state point d; then moving the $CO_2$ working fluid into the $CO_2$ main circuit expansion valve 4 to be expanded, in such a manner that an expanded low-pressure working fluid reaches a state point e; moving the expanded low-pressure working fluid into the evaporator 5 for evaporation and absorbing heat, so as to return to the state point a, and finally returning to the inlet of the $CO_2$ main circuit compressor 1;

for the auxiliary circuit: compressing the $CO_2$ working fluid from a state point f through the $CO_2$ auxiliary compressor 6 to reach a state point g, and moving the $CO_2$ working fluid into the $CO_2$ auxiliary circuit 10 of the air-cooling-air-cooling recombiner 2 for heating the circulating water in the water circuit 11; self-cooling the $CO_2$ working fluid to reach a state point h, then moving the $CO_2$ working fluid into the $CO_2$ auxiliary circuit expansion valve 7 to be expanded to reach a state point i; moving the expanded low-pressure working fluid into the $CO_2$ auxiliary circuit evaporation section 13 of the supercooling-evaporation recombiner 3 for exchanging heat with and further cooling the $CO_2$ main circuit supercooling section 12; self-evaporating the expanded low-pressure working fluid to absorb heat and reach the state point f, and finally returning to the inlet of the $CO_2$ auxiliary compressor 6.

In the air-cooling-air-cooling recombiner 2, the $CO_2$ working fluid of the main circuit is cooled and releases heat in the $CO_2$ main circuit 9, and the $CO_2$ working fluid of the auxiliary circuit is cooled and releases heat in the $CO_2$ auxiliary circuit 10; the circulating water absorbs heat to reach a preset temperature; in the supercooling-evaporation recombiner 3, the $CO_2$ working fluid of the main circuit is further cooled and releases heat in the $CO_2$ main circuit supercooling section 12, and the $CO_2$ working fluid of the auxiliary circuit is evaporated and absorbs heat in the $CO_2$ auxiliary circuit evaporation section 13; the $CO_2$ auxiliary circuit evaporation section 13 exchanges heat with the $CO_2$ main circuit supercooling section 12 to maintain heat balance.

Auxiliary circuit control: when the return water temperature is high (greater than or equal to 30° C.), the exhaust pressure of the $CO_2$ auxiliary circuit is higher, the heat generation is larger, and the operation effect is better. From the perspective of the control principle, a fitting formula of the $CO_2$ auxiliary circuit exhaust pressure is proposed for controlling the exhaust pressure of the compressor 6, so as to ensure the high performance of the entire system. An auxiliary circuit control method comprises steps of: with given $t_{g,out\ auxiliary}$ (a $CO_2$ auxiliary circuit outlet temperature of the air-cooling-air-cooling recombiner 2), $t_{ambient}$ (an ambient temperature), and $t_{return}$ (a water circuit outlet temperature of the air-cooling-air-cooling recombiner 2), calculating $P_{CO2,auxiliary}$ (an exhaust pressure of the $CO_2$ auxiliary compressor 6) by a formula, and adjusting an opening degree of the $CO_2$ auxiliary expansion valve 7 to achieve a preset pressure, so as to ensure the high performance of the entire system. The present invention proposes an adaptive frequency control formula for the $CO_2$ auxiliary compressor 6 when the working conditions change. The temperature at d in the cycle needs to be kept at a suitable value. In order to balance the power consumption of the $CO_2$ auxiliary compressor 6, the compressor frequency can be varied with the working conditions to keep the system operating efficiently, and the following fitting formula is proposed. $f_{compress\ 6}$ (a motor frequency of the $CO_2$ auxiliary compressor 6) can be calculated by the formula, in such a manner that a compressor frequency changes with a working condition to ensure the high performance of the entire system.

$$P_{co2,auxiliary} = 0.0036 t_{g,out\ auxiliary}^2 - 0.02 t_{g,out\ auxiliary} - 0.035 t_{ambient} + 0.067 t_{return} + 7.38 \quad (I);$$

$$f_{compress\ 6} = 50 - 0.005 t_{g,out\ auxiliary}^2 + 0.17 t_{g,out\ auxiliary} + 0.65 t_{ambient} + 0.13 t_{return} \quad (II);$$

A main circuit control method comprises steps of: with given $t_{g,out\ main}$ (a $CO_2$ main circuit outlet temperature of the air-cooling-air-cooling recombiner 2), $t_{ambient}$ (an ambient temperature), and $t_{return}$ (a water circuit outlet temperature of the air-cooling-air-cooling recombiner 2), calculating $P_{CO2,main}$ (an optimal discharge pressure of the $CO_2$ main circuit compressor 1) by a formula, and adjusting an opening degree of the $CO_2$ main circuit expansion valve 4 to achieve a preset pressure, so to ensure the high performance of the entire system.

$$P_{CO2,main} = \frac{50}{f_{compressor1}} \left( 0.00171 t_{g,out\ main}^2 - 0.03 t_{g,out\ main} - 0.018 t_{ambient} - 0.03 \sqrt{t_{return}} + 7.38 \right). \quad (III)$$

In order to ensure sufficient heat exchange between $CO_2$ and water, the present invention creatively proposes the optimal structural parameters of the air-cooling-air-cooling recombiner 2: when selecting the air-cooling-air-cooling recombiner 2, $D_L$: a center distance between the inner tubes can be calculated based on the parameter $D_1$: a diameter of the outer tube and a formula, so as to select the air-cooling-air-cooling recombiner 2 that is most suitable for the system.

$$D_L = 1.7 D_2 \quad (IV)$$

$$D_1/D_2 = 3.7 \quad (V).$$

What is claimed is:

1. A control method of a transcritical carbon dioxide composite heat pump system, wherein the transcritical carbon dioxide composite heat pump system comprises: a $CO_2$ main circuit compressor (1), an air-cooling-air-cooling recombiner (2), a supercooling-evaporation recombiner (3), an evaporator (5) and a $CO_2$ auxiliary compressor (6); wherein the air-cooling-air-cooling recombiner (2) comprises a $CO_2$ main circuit (9), a $CO_2$ auxiliary circuit (10) and a water circuit (11); the supercooling-evaporation recombiner (3) comprises a $CO_2$ main circuit supercooling section (12) and a $CO_2$ auxiliary circuit evaporation section (13); the transcritical carbon dioxide composite heat pump system comprises a main circuit and an auxiliary circuit;

for the main circuit: an outlet of the $CO_2$ main circuit compressor (1) is connected to an inlet of the $CO_2$ main circuit (9) of the air-cooling-air-cooling recombiner (2); an outlet of the $CO_2$ main circuit (9) of the air-cooling-air-cooling recombiner (2) is connected to an inlet of the $CO_2$ main circuit supercooling section (12) of the supercooling-evaporation recombiner (3); an outlet of the $CO_2$ main circuit supercooling section (12) of the subcooling-evaporation recombiner (3) is connected to an inlet of the evaporator (5); and an outlet of the evaporator (5) is connected to an inlet of the $CO_2$ main circuit compressor (1);

for the auxiliary circuit: an outlet of the $CO_2$ auxiliary compressor (6) is connected to an inlet of the $CO_2$ auxiliary circuit (10) of the air-cooling-air-cooling recombiner (2); an outlet of the $CO_2$ auxiliary circuit (10) of the air-cooling-air-cooling recombiner (2) is connected to an inlet of the $CO_2$ auxiliary circuit evaporation section (13) of the supercooling-evaporation recombiner (3); an outlet of the $CO_2$ auxiliary circuit evaporation section (13) of the supercooling-evaporation recombiner (3) is connected to an inlet of the CO₂ auxiliary compressor (6);

a CO₂ main circuit expansion valve (4) is arranged between the supercooling-evaporation recombiner (3) and the evaporator (5) on the main circuit; and a CO₂ auxiliary expansion valve (7) is arranged between the air-cooling-air-cooling recombiner (2) and the supercooling-evaporation recombiner (3) on the auxiliary circuit;

the transcritical carbon dioxide composite heat pump system operates in a cyclic heating mode, and the control method comprises steps of:

starting the CO₂ main circuit compressor (1) and turning on the main circuit; starting the CO₂ auxiliary compressor (6) and turning on the auxiliary circuit, and keeping a fan (8) at a working state;

for the main circuit: compressing a CO₂ working fluid from a state point a through the CO₂ main circuit compressor (1) to reach a state point b, and moving the CO₂ working fluid into the CO₂ main circuit (9) of the air-cooling-air-cooling recombiner (2) for heating circulating water in the water circuit (11); self-cooling the CO₂ working fluid to an appropriate temperature to reach a state point c, then passing the CO₂ working fluid through the CO₂ main circuit supercooling section (12) of the supercooling-evaporation recombiner (3) to exchange heat with the CO₂ auxiliary circuit evaporation section (13), so as to further cool down to reach a state point d; then moving the CO₂ working fluid into the CO₂ main circuit expansion valve (4) to be expanded, in such a manner that an expanded low-pressure working fluid reaches a state point e; moving the expanded low-pressure working fluid into the evaporator (5) for evaporation and absorbing heat, so as to return to the state point a, and finally returning to the inlet of the CO₂ main circuit compressor (1);

for the auxiliary circuit: compressing the CO₂ working fluid from a state point f through the CO₂ auxiliary compressor (6) to reach a state point g, and moving the CO₂ working fluid into the CO₂ auxiliary circuit (10) of the air-cooling-air-cooling recombiner (2) for heating the circulating water in the water circuit (11); self-cooling the CO₂ working fluid to reach a state point h, then moving the CO₂ working fluid into the CO₂ auxiliary circuit expansion valve (7) to be expanded to reach a state point i; moving the expanded low-pressure working fluid into the CO₂ auxiliary circuit evaporation section (13) of the supercooling-evaporation recombiner (3) for exchanging heat with and further cooling the CO₂ main circuit supercooling section (12); self-evaporating the expanded low-pressure working fluid to absorb heat and reach the state point f, and finally returning to the inlet of the CO₂ auxiliary compressor (6);

wherein an auxiliary circuit control method comprises steps of: collecting an ambient temperature $t_{ambient}$, a CO₂ auxiliary circuit outlet temperature $t_{g,out\ auxiliary}$ of the air-cooling-air-cooling recombiner (2) set by a user, and a water circuit outlet temperature $t_{return}$ of the air-cooling-air-cooling recombiner (2) set by the user; calculating an exhaust pressure $P_{CO_2,auxiliary}$ of the CO₂ auxiliary compressor (6) by a formula (I), and adjusting an opening degree of the CO₂ auxiliary expansion valve (7) to achieve a preset pressure; and calculating a motor frequency $f_{compress\ 6}$ of the CO₂ auxiliary compressor (6) by a formula (II), in such a manner that a compressor frequency changes with a working condition;

$$P_{CO_2,auxiliary} = 0.0036 t_{g,out\ auxiliary}^2 - 0.02 t_{g,out\ auxiliary} - 0.035 t_{ambient} + 0.067 t_{return} + 7.38 \quad (I);$$

$$f_{compress\ 6} = 50 - 0.005 t_{g,out\ auxiliary}^2 + 0.17 t_{g,out\ auxiliary} + 0.65 t_{ambient} + 0.13 t_{return} \quad (II);$$

wherein a main circuit control method comprises steps of: collecting the ambient temperature $t_{ambient}$, a CO₂ main circuit outlet temperature $t_{g,out\ main}$ of the air-cooling-air-cooling recombiner (2) set by the user, and the water circuit outlet temperature $t_{return}$ of the air-cooling-air-cooling recombiner (2) set by the user; then calculating an optimal discharge pressure $P_{CO2,main}$ of the CO₂ main circuit compressor (1) by a formula (III), and adjusting an opening degree of the CO₂ main circuit expansion valve (4) to achieve a preset pressure;

$$P_{CO2,main} = \frac{50}{f_{compressor1}} (0.00171 t_{g,out\ main}^2 - 0.03 t_{g,out\ main} - 0.018 t_{ambient} - 0.03 \sqrt{t_{return}} + 7.38). \quad (III)$$

2. The control method, as recited in claim 1, wherein in the air-cooling-air-cooling recombiner (2), the CO₂ working fluid of the main circuit is cooled and releases heat in the CO₂ main circuit (9), and the CO₂ working fluid of the auxiliary circuit is cooled and releases heat in the CO₂ auxiliary circuit (10); the circulating water absorbs heat to reach a preset temperature; in the supercooling-evaporation recombiner (3), the CO₂ working fluid of the main circuit is further cooled and releases heat in the CO₂ main circuit supercooling section (12), and the CO₂ working fluid of the auxiliary circuit is evaporated and absorbs heat in the CO₂ auxiliary circuit evaporation section (13); the CO₂ auxiliary circuit evaporation section (13) exchanges heat with the CO₂ main circuit supercooling section (12) to maintain heat balance.

3. The control method, as recited in claim 1, wherein the air-cooling-air-cooling recombiner (2) comprises three inner pipes and one outer pipe, wherein two of the inner pipes serve as the CO₂ main circuit (9), and the other one of the inner pipes serves as the CO₂ auxiliary circuit (10); a circuit between the outer pipe and the three inner pipes is the water circuit (11); the three inner pipes are arranged in an equilateral triangle form with identical pipe spacings $D_L$ and identical diameters $D_2$; the outer pipe has a diameter $D_1$; first ends of the two CO₂ main circuits (9) are combined into one pipe connected to an exhaust port of the CO₂ main circuit compressor (1) on an external side of the air-cooling-air-cooling recombiner (2), and second ends of the two CO₂ main circuits (9) are combined into one pipe connected to the CO₂ main circuit supercooling section (12) on the external side of the air-cooling-air-cooling recombiner (2);

a relationship between the pipe spacings $D_L$ of the three inner pipes, the diameters $D_2$ of the three inner pipes, and the diameter $D_1$ of the outer pipe is:

$$D_L = 1.7 D_2 \quad (IV)$$

$$D_1/D_2 = 3.7 \quad (V).$$

4. The control method, as recited in claim 1, wherein the fan (8) is installed on the evaporator (5).

5. The control method, as recited in claim 1, wherein the $CO_2$ auxiliary compressor (6) is an inverter compressor.

6. The control method, as recited in claim 1, wherein the transcritical carbon dioxide composite heat pump system operates in the cyclic heating mode when a water circuit outlet temperature of the air-cooling-air-cooling recombiner (2) set by the user is greater than or equal to 30° C.

* * * * *